United States Patent
Siegl

(10) Patent No.: US 9,233,771 B2
(45) Date of Patent: Jan. 12, 2016

(54) PREFORM FOR PRODUCING PLASTIC CONTAINERS IN A STRETCH BLOW MOULDING PROCESS AND METHOD FOR PRODUCING THE PREFORM

(75) Inventor: Robert Siegl, Dornbirn (AT)

(73) Assignee: ALPLA WERKE ALWIN LEHNER GMBH & CO. KG, Hard (AT)

(*) Notice: Subject to any disclaimer, the term of this patent is extended or adjusted under 35 U.S.C. 154(b) by 130 days.

(21) Appl. No.: 13/721,451

(22) PCT Filed: May 18, 2011

(86) PCT No.: PCT/EP2011/002461
§ 371 (c)(1),
(2), (4) Date: May 6, 2013

(87) PCT Pub. No.: WO2011/160748
PCT Pub. Date: Dec. 29, 2011

(65) Prior Publication Data
US 2013/0216748 A1   Aug. 22, 2013

(30) Foreign Application Priority Data

Jun. 24, 2010   (CH) .......................................... 1024

(51) Int. Cl.
B65D 1/02   (2006.01)
B29B 11/14   (2006.01)
(Continued)

(52) U.S. Cl.
CPC .............. *B65D 1/0223* (2013.01); *B29B 11/14* (2013.01); *B29C 49/04* (2013.01); *B29D 22/003* (2013.01);
(Continued)

(58) Field of Classification Search
CPC  B29B 11/14; B29B 11/10; B29B 2911/1402; B29B 2911/14026; B29B 2911/14033; B29B 2911/1404; B29B 2911/14053; B29B 2911/14066; B29B 2911/1408; B29B 2911/14093; B29B 2911/14106; B29B 2911/14113; B29B 2911/1416; B29B 2911/14166; B29B 2911/14326; B29B 2911/14333; B29B 2911/14366; B29B 2911/144; B29B 2911/14433; B29B 2911/1444; B29B 2911/14633; B29B 2911/14666; B29B 2911/14753; B29B 2911/1476; B29B 2911/1482; B29C 49/04; B29C 49/22; B65D 1/0223; B29D 22/003; B32B 1/02; B29K 2023/065; B29K 2023/12; B29K 2025/00; B29K 2027/06; B29K 2027/08; B29K 2067/00; B29K 2067/046; B29K 2077/00; B29K 2105/0032; B29K 2105/0044; B29K 2105/005; B29K 2105/26; B29K 2995/0067; Y10T 428/1379; Y10T 428/1397; Y10T 428/1352
USPC .......................... 428/36.6, 36.92, 35.7, 542.8
See application file for complete search history.

(56) References Cited

U.S. PATENT DOCUMENTS 4,432,719 A   2/1984   Hafele
2002/0182351 A1   12/2002   Akiyama et al.
(Continued)

FOREIGN PATENT DOCUMENTS

EP   1 344 618 A1   9/2003
EP   1 688 235 A1   8/2006
WO   WO 91/08099 A1   6/1991

OTHER PUBLICATIONS

International Search Report (PCT/ISA/210) issued on Jul. 10, 2011, by the European Patent Office as the International Searching Authority for International Application No. PCT/EP2011/002461.

*Primary Examiner* — Michael C Miggins
(74) *Attorney, Agent, or Firm* — Buchanan Ingersoll & Rooney PC

(57) ABSTRACT

A method for producing a preform and a preform produced by extrusion blow molding for producing plastic containers in a stretch blow molding process and having a neck portion and a body portion closed by a preform base, which portions are separated from each other by a supporting ring protruding from the outer wall. The preform has a body portion of which the outside diameter narrows from the supporting ring in the direction of the preform base.

20 Claims, 1 Drawing Sheet

(51) Int. Cl.
  B29C 49/04      (2006.01)
  B29D 22/00      (2006.01)
  B32B 1/02       (2006.01)
  B29B 11/10          (2006.01)
  B29C 49/22          (2006.01)
  B29K 23/00          (2006.01)
  B29K 25/00          (2006.01)
  B29K 27/06          (2006.01)
  B29K 27/00          (2006.01)
  B29K 67/00          (2006.01)
  B29K 77/00          (2006.01)
  B29K 105/00         (2006.01)
  B29K 105/26         (2006.01)

(52) U.S. Cl.
  CPC . *B32B 1/02* (2013.01); *B29B 11/10* (2013.01); *B29B 2911/1402* (2013.01); *B29B 2911/144* (2013.01); *B29B 2911/1404* (2013.01); *B29B 2911/1408* (2013.01); *B29B 2911/1416* (2013.01); *B29B 2911/14026* (2013.01); *B29B 2911/14033* (2013.01); *B29B 2911/1444* (2013.01); *B29B 2911/14053* (2013.01); *B29B 2911/14066* (2013.01); *B29B 2911/1476* (2013.01); *B29B 2911/1482* (2013.01); *B29B 2911/14093* (2013.01); *B29B 2911/14106* (2013.01); *B29B 2911/14113* (2013.01); *B29B 2911/14166* (2013.01); *B29B 2911/14326* (2013.01); *B29B 2911/14333* (2013.01); *B29B 2911/14366* (2013.01); *B29B 2911/14433* (2013.01); *B29B 2911/14633* (2013.01); *B29B 2911/14666* (2013.01); *B29B 2911/14753* (2013.01); *B29C 49/22* (2013.01); *B29K 2023/065* (2013.01); *B29K 2023/12* (2013.01); *B29K 2025/00* (2013.01); *B29K 2027/06* (2013.01); *B29K 2027/08* (2013.01); *B29K 2067/00* (2013.01); *B29K 2067/046* (2013.01); *B29K 2077/00* (2013.01); *B29K 2105/005* (2013.01); *B29K 2105/0032* (2013.01); *B29K 2105/0044* (2013.01); *B29K 2105/26* (2013.01); *B29K 2995/0067* (2013.01); *Y10T 428/1352* (2015.01); *Y10T 428/1379* (2015.01); *Y10T 428/1397* (2015.01)

(56) References Cited

U.S. PATENT DOCUMENTS

| | | |
|---|---|---|
| 2006/0141189 A1 | 6/2006 | Akiyama et al. |
| 2006/0175738 A1 | 8/2006 | Connolly et al. |
| 2007/0252304 A1 | 11/2007 | Pennington et al. |

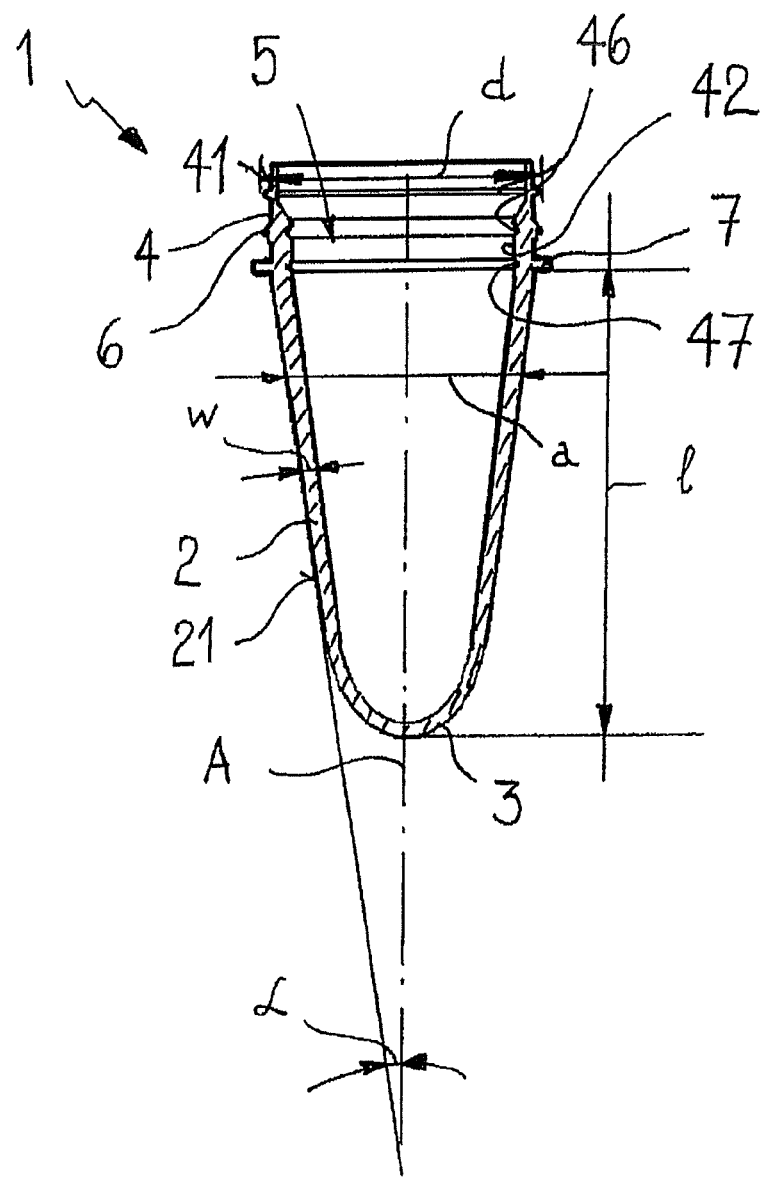

PREFORM FOR PRODUCING PLASTIC CONTAINERS IN A STRETCH BLOW MOULDING PROCESS AND METHOD FOR PRODUCING THE PREFORM

RELATED APPLICATION(S)

This application claims priority as a National Stage application under 35 U.S.C. §371 to PCT/EP2011/002461, which was filed as an International Application on May 18, 2011 designating the U.S., and which claims priority to Swiss Application 1024/10 filed in Switzerland on Jun. 24, 2010. The entire contents of these applications are hereby incorporated by reference in their entireties.

FIELD

The disclosure relates to a preform for producing plastic containers in a stretch blow molding process and to a method for producing the preform.

BACKGROUND INFORMATION

A large number of the plastic containers are currently in use, especially for example, plastic bottles and the like. The plastic containers can be produced in a stretch blow molding process. In this method a so-called preform, which can have a tubular shape, on its one longitudinal end has a bottom and on another longitudinal end, a neck region with molded threaded sections or the like, is inserted into the mold cavity of a blow mold and is inflated by a medium which is blown in with overpressure. In doing so the preform can be additionally stretched in the axial direction with a stretching mandrel which is inserted through the neck opening. After this stretching/blowing process, the finished, stretch-set plastic container is removed from the blow mold.

The known preforms can be produced in an injection molding method. Relatively thin-liquid materials can be used due to the injection molding method. A raw material which is often used for producing plastic containers in the stretch blow molding process is PET (polyethylene terephthalate). PET has low viscosity which is desirable for the injection molding process at high temperatures around 280° C. and has been repeatedly tested and its properties have been known for a long time. Unfortunately PET bottles can have extremely poor barrier properties relative to water and light, and the introduction of barrier layers can be complex.

For polyolefins, generally PE or PP, processing via the extrusion process without a stretch blow molding process is a known processing method for bottles. However, polyolefins do not have optimum stretch setting in the subsequent stretch blow molding process. So that PET containers achieve the required mechanical strengths (buckling pressure, internal compressive strength, etc.), they should not fall below a minimum wall thickness of roughly 0.2 mm. For ecological reasons and as a result of high raw material costs, there is on the other hand great interest in still further reducing the wall thicknesses of the plastic containers.

Preforms for plastic containers which have been produced in the stretch blow molding process can have a multilayer structure. For example, preforms are known with three or more layers which include, for example, barrier layers or getter layers for gases, opaque layers, etc. Multilayer preforms are also known in which one or more layers contain regenerate material. To join the different layers to one another, a coupling agent as a blend or as a copolymer is admixed, for example, with the base polymer or the barrier layer. The coupling agent can be integrated more or less homogeneously into the raw material or barrier material. It can develop its action however only on the interfaces of the layers which are to be joined to one another. In the remaining raw material, it may be of no benefit and in part can degrade the mechanical or barrier properties there. For ecological reasons and for reasons of costs there is however interest in reducing the amount of the coupling agent.

In the production of the preforms in the injection molding process, known pressures of up to roughly 1000 bar can occur in the melt. In order to keep the closing forces within reasonable boundaries, the injection molds often have only a few cavities. This can lead to relatively high production costs in preforms with large neck diameters of 48 mm and more for so-called wide-neck bottles with relatively small capacities.

EP-1 344 618 A1 discloses preforms for use in a stretch blow molding process. The preform, whose production is not detailed, has a shoulder region which is arched to the outside following the supporting ring which separates the neck section of the preform from its body section. The inner surface of the preform in the region of the supporting ring is made as a conical surface which widens in the direction of the spherical bottom of the preform. EP-1 344 618 A1 discloses the forming of the preform with a body section which has distinctly larger inside and outside diameters than the neck section. This known preform in its production is already so strongly deformed that a further and prompt axial and radial orientation in the following stretch blow molding process is too little and does not lead to the desired stretch setting of the plastic container which has been produced.

SUMMARY

A preform is disclosed for producing plastic containers in a stretch blow molding process, comprising: a neck section; a body section adjoining the neck section; a preform bottom for closing the body section; and a supporting ring which protrudes from an outside wall of the preform and separates the neck section from the body section, wherein the preform is produced in an extrusion blow molding process and the body section has an outside diameter which is made tapered from the supporting ring in a direction of the preform bottom.

A method is disclosed for producing a preform including a neck section, a body section adjoining the neck section, a preform bottom for closing the body section, and a supporting ring which protrudes from an outside wall of the preform and separates the neck section from the body section, wherein the body section has an outside diameter which tapers from the supporting ring in a direction of the preform bottom, the method comprising: extruding a single-layer or multilayer plastic tubing; forming the plastic tubing with a blow mold into a preform, with the neck section and the body section being closed with the preform bottom, and being separated from one another by the supporting ring; removing the preform from the blow mold; and pressing the plastic tubing surrounded by the blow mold for forming the body section with an outside diameter which is tapered from the supporting ring in a direction of the preform bottom with a support pressure against inside walls of the blow mold.

BRIEF DESCRIPTION OF THE DRAWINGS

FIG. 1 is a schematic of an exemplary embodiment of a preform according to the disclosure.

DETAILED DESCRIPTION

Exemplary embodiments of this disclosure can make available a preform for processing in a stretch blow molding process which can mitigate the described disadvantages of the preforms which are produced by known methods. A preform according to an exemplary embodiment of the disclosure can make it possible to produce from it, in a stretch blow molding process, plastic containers which have sufficient stretch setting. The preform can also make it possible to reduce the production costs for wide-neck bottles. Furthermore, the prerequisites for simple, economical and ecologically acceptable production of multilayer preforms will be created which also allows a simple integration of regenerate material.

A preform according to an exemplary embodiment of the disclosure can be produced by an extrusion blow molding process and can be made for producing plastic containers in a stretch blow molding process and has a neck section and a body section which is closed with a preform bottom, which are separated from one another by a supporting ring which protrudes from the outside wall. In contrast to the known preforms, the preform according to an exemplary embodiment of the disclosure has a body section whose outside diameter tapers from the supporting ring in the direction of the preform bottom.

Due to the execution of the preform according to an exemplary embodiment of the disclosure it is deformed only to a very small extent in its production by extrusion blow molding. Differently than in the known preforms whose body section is distinctly widened in production by an intense internal pressure, in the production of the preform according to an exemplary embodiment of the disclosure, only a relative low support pressure may be necessary to press the body section of the preform against the inside wall of the mold where it is cooled to the required degree. Actual radial deformation (expansion) of the body sections can be largely prevented. Although the preform can be produced by extrusion, the classic blow molding process does not take place, but only a minor deformation due to the support pressure.

The preforms produced in a quasi-extrusion blow molding process can have benefits of the extrusion blow molding process without however accepting the disadvantage of an only insufficient stretch setting in the following stretch blow molding process. The transition from the injection molding process to the quasi-extrusion blow molding process can reduce the system costs. This is advantageous for the production of preforms with large neck diameters for so-called wide-neck bottles. The extrusion blow molding process is not restricted to the use of thin-liquid raw materials, which use is limited in terms of flow technology by a narrow injection point with high pressure loss, like the injection molding method. It also allows the processing of more highly viscous materials whose large macromolecules can cause an especially intense stretch setting. The production of multilayer preforms can also take place ecologically and economically more advantageously because the extrusion of multilayer structures can be carried out relatively without problems because they need not be routed through an injection point. Instead of, for example, having to integrate a coupling agent into an entire layer, it can also be worked only into the boundary layer as an additional layer in a controlled manner. In this way the amount of coupling agent can be distinctly reduced. Regenerate material can also be very easily integrated in the extrusion.

The geometrical execution of the preform with a body section which is made tapered compared to the outside diameter of the neck section can ensure that the preform in a stretch blow molding process is axially and radially stretch-set to a sufficient degree. In this way the plastic container which has been produced, at the same weight, can have higher mechanical characteristics, such as buckling compressive strength, internal compressive strength, etc. than plastic containers which have been produced with known preforms. This can make it possible to further optimize the preforms in the sense of raw cost savings with respect to their wall thicknesses without in this way having to make cuts in the mechanical strengths of the plastic containers which have been produced.

In the two-stage stretch blow molding process, the preforms can be produced separately in time and space from the stretch blow molding. Here the geometrical execution of the preform with a body section which has been made tapered relative to the outside diameter of the neck section can also simplify the separation and alignment of the preforms which are supplied as bulk material. This can take place, for example, via two rotating rolls which are located at a distance from one another. The body sections of the preforms fall through the gap between the two rolls. Because the gap width is smaller than the outside diameter measured over the supporting ring, the preforms are supported via the supporting ring and can thus be transported to further processing stations.

For good expansion and stretch set-up in the stretch blow molding process, the body section of the preform can have an axial length which is substantially 0.3 times to substantially 8 times (e.g., ±10%) the outside diameter of its neck section. For example, the preform body can have an axial length of substantially 15 mm to roughly 150 mm (e.g., ±10%).

For reasons of production engineering and also for reasons of better stretch set-up, it has proven advantageous if the outside diameter of the body section of the preform continually tapers in the direction of the preform bottom. In doing so, the outside wall of the body section can include an angle of 0.5° to 5°*(e.g., ±10%) with the preform axis.

For producing plastic bottles with the required mechanical properties, the body section of the extrusion blow molded preform can have a wall thickness of about 0.4 to 4 mm, for example, 1.8 to 2.8 mm.

Depending on the type of plastic container to be produced and the application, the preform can be extruded in one or more layers.

Here the preform has at least one layer of a plastic or of a plastic mixture of the group consisting of polyolefins, polystyrenes, PVC, PVDC, polyesters, PLA (polylactic acids) and amides. These raw materials often have large macromolecules which make them unsuitable for the injection molding process, but on the other hand can be advantageous for the stretch and expansion set-up of the plastic container which has been produced from the preform in the stretch blow molding method.

In one exemplary embodiment of the preform according to the disclosure it has at least one layer of PET with an intrinsic viscosity greater than 0.92 dl/g, but less than 1.6 dl/g.

Another exemplary embodiment of the preform according to the disclosure calls for it to have at least one layer of monomodal, bimodal or polymodal HDPE or polypropylene. For example, the preform has at least one layer of HDPE with a MFI 190° C. 2.16 kg smaller 0.1 g/10 min and MFI 190° C. 21.6 kg smaller 5 g/10 min.

Another exemplary embodiment of the multilayer preform according to the disclosure has at least one layer with barrier additives, for example, oxygen traps, light barriers, nanoclays or UV blockers. Alternatively or in addition the preform can have at least one barrier layer against oxygen and/or UV radiation and/or a slip coating and/or a residual emptying coating. The preform which has been extruded in several layers can also have at least one layer of recycled plastic material. The extrusion process can also make it possible to provide the preform with a different color layer at least in regions. Here a variable color characteristic can be set or even a transversely and/or longitudinally striped preform can be produced.

Another exemplary embodiment of the preform according to the disclosure calls for it to have a transparent visual strip which runs axially in the body section. It can be used for example as liquid level monitoring on the plastic container which has been stretch blow molded to completion.

In another exemplary embodiment of the preform according to the disclosure it has a neck section with an outside diameter of at least 48 mm. These preforms can be needed for producing wide-neck containers and can have an outside diameter of up to 300 mm. The extrusion blow molding method for the preforms can also allow economical production of these containers.

A preform according to an exemplary embodiment of the disclosure includes an outside wall of the neck section provided with threaded sections or similar locking projections. The neck section can remain unchanged in the subsequent stretch blow molding process and can be used to attach a screw closure, snap closure or quarter-turn closure.

In contrast to the preforms produced in an injection molding method or in a flow molding method, in the quasi-extrusion blow molded preform the threaded sections or similar locking projections can be made hollow. This can save raw material.

In another exemplary embodiment of the preform according to the disclosure, the supporting ring which separates the neck section from the body section can be made hollow. The resulting savings of weight and raw material have an advantageous effect on the production costs of the preforms and thus of the plastic containers.

In contrast to known extrusion blow molded preforms with larger diameter body sections, the preform according to an exemplary embodiment of the disclosure is radially hardly expanded in production. To form the body section with an outside diameter which is made tapered relative to the outside diameter of the neck section from the supporting ring in the direction of the preform bottom, the extruded tubing section which has been inserted into the mold cavity is pressed against the inside walls of the mold only with low support pressure. This can largely prevent deformation of the preform. A classic blow molding process with internal pressures up to 50 bars and higher, as in a known extrusion blow molding process, may not in fact take place at all. The support pressure used for producing the preform as claimed in the disclosure can be only 0.1 bar to 8 bar.

The quasi-extrusion blow molded preforms according to an exemplary embodiment of the disclosure can be for production of plastic containers, especially plastic bottles, in a single-stage or two-stage stretch blow molding process. A single-stage stretch blow molding process can be defined as a method in which the preforms are moved into the final mold immediately after their production. In the two-stage stretch blow molding process the preforms can be produced separately in space and time from the stretch blow molding process, and the preforms which have been produced are stored in the interim until their use.

Other advantages and versions of the disclosure will become apparent from the following description of exemplary embodiments with reference to the sole schematic which is not to scale and which shows a quasi-extrusion blow molded preform as claimed in the disclosure in an axial section.

The schematically shown preform which is labeled 1 overall is a preform which has been produced in an extrusion blow molding process. It has a body section 2 whose longitudinal end is closed with a preform bottom 3. The preform bottom 3, as shown by way of example, can have the shape of a spherical surface. In other exemplary embodiments of the preform according to the disclosure, the preform bottom can also be arched to the inside. Another exemplary embodiment of the preform according to the disclosure, can be made with a preform bottom whose inside wall and outside wall border a flat scattering lens. In conjunction with a suitable index of refraction of the preform material from 1.3 to 1.6, the shape of the preform bottom as a flat scattering lens can lead to the electromagnetic heat radiation which has been emitted inwardly for reheating of the preform before the actual stretch blow molding process to be deflected away from the holder for the preform. This results in that during reheating a larger portion of the electromagnetic heat radiation which has been added is absorbed in the preform bottom and in the wall of the body section.

The end section of the body section 2 opposite the preform bottom 3 adjoins a neck section 4 which is provided with the fill or pour opening 5. On the outside wall 41 of the neck section 4 threaded sections 6 or similar projections are made. The threaded sections 6 or similar projections on the container which has been stretch blow molded to completion can allow the screwing-on or attachment of a closure or cover equipped with corresponding locking elements.

The body section 2 and the neck section 4 of the preform 1 are separated from one another by a supporting ring 7 which is also called a transfer ring. The supporting ring 7 protrudes somewhat radially at the transition from the outside wall 41 of the neck section 4 to one outside wall 21 of the body section 2.

The body section 2 tapers from the supporting ring 7 in the direction of the preform bottom 3. In the illustrated exemplary embodiment, the body section 2 is made continuously conical. Other exemplary embodiments of the preform can for example, have a body section which tapers in steps. Another exemplary embodiment of the preform can also be provided with a body section which is made curved in the direction of the preform bottom. For example, the body section at the transition to the preform bottom can have a smaller radius of curvature than at the transition to the neck section.

In the case of the preform 1 which is shown by way of example, its body section 2 has an outside diameter "a" which tapers continually in the direction of the preform bottom 3. Here the outside wall 21 of the body section 2 includes an angle $\alpha$ of about 0.5° to 5° (e.g., ±10%) with an axis A of the preform 1. In the case of a body section which changes its outside diameter in a staggered manner, the indicated angle range relates to the angle which an imaginary connecting line from the outside diameter of the body section directly underneath the supporting ring to the outside diameter of the body section at the transition to the preform bottom includes with the axis of the preform.

The body section 2 of the preform 1 has an axial length l which is substantially 0.3 times to 8 times (e.g., ±10%) an outside diameter d of its neck section 4. The axial length of the body section 2 of the preform 1 is, for example, substantially 15 mm to roughly 150 mm (e.g., ±10%).

The body section 2 of the extrusion blow molded preform 1 has an average wall thickness w from 0.4 to 4 mm, for example, 1.8 to 2.8 mm.

The extrusion blow molded preform 1 can be made in one or more layers. The preform 1 can have at least one layer of a plastic or of a plastic mixture of the group consisting of polyolefins, polystyrenes, PVC, PVDC, polyesters, PLA (polylactic acids) and amides. These raw materials can have large macromolecules which make them unsuitable for the injection molding process but on the other hand they are very advantageous for the stretch and expansion set-up of the plastic containers produced in the stretch blow molding process from the preform.

One version of the preform can have at least one layer of PET with an intrinsic viscosity greater than 0.92 dl/g but less than 1.6 dl/g. Another exemplary embodiment of the preform has at least one layer of monomodal, bimodal or polymodal HDPE or polypropylene. For example, the preform has at least one layer of HDPE with a MFI 190° C. 2.16 kg smaller 0.1 g/10 min or MFI 190° C. 21.6 kg smaller 5 g/10 min.

The preform 1 can be produced by extrusion blow molding. In doing so, first the tubing is extruded through the annular gap of an extrusion nozzle. The annular gap can have a gap width of roughly 0.5 mm to 5 mm. The material is handled carefully during extrusion because extrusion takes place "into the open" and thus a counter-pressure does not build up. Conversely, in injection molding, the material can be injected through a needle nozzle into an injection cavity, which nozzle has a diameter from roughly 1.5 mm to 5 mm. The peak pressures which arise here are 200 bar to 2000 bar and reach their peak when the injection cavity reaches its maximum fill level and a high counterpressure builds up in the mold. The carefully extruded material tubing is introduced into the mold in sections and is pressed against the inside walls of the mold with a small support pressure. This can prevent deformation of the perform 1. A classic blow molding process with internal pressures up to 50 bar and higher as in known extrusion blow molding processing may not in fact take place at all. The support pressure used for producing the preform 1 as claimed in the disclosure is only roughly 0.1 bar to 8 bar.

The preform 1 which has been produced in a quasi-extrusion blow molding process in its neck section 4 has an inside wall 42 which is made recessed in the manner of a groove in the region 46 of the threaded sections 6 and in the region 47 of the supporting ring 7. The threaded sections 6 and the supporting ring 7 are thus made "hollow." This can save raw material.

The production of the preform 1 as claimed in the disclosure in a quasi-extrusion blow molding process enables careful treatment of the raw material. In particular, multilayer preforms can be produced economically by the extrusion. In this way, for example multilayer preforms which have at least one layer with barrier additives, especially oxygen traps, nanoclays or UV blockers, can be very easily produced. Alternatively or in addition, preforms with at least one barrier layer against oxygen and/or UV radiation and/or a slip coating and/or a residual emptying coating can also be very easily extruded. The preform which has been extruded in several layers can also have at least one layer of recycled plastic material. The extrusion process can also make it possible to provide the preform with a different color layer at least in regions. Here a variable color characteristic can be set or even a striped preform can be produced. The preform can be produced with a transparent visual strip which runs axially in the body section. It can then be used for example as a liquid level monitor on the plastic container which has been stretch blow molded to completion.

Finally, the production of the preform in a quasi-extrusion blow molding process can also allow simple and economical production of preforms for wide-neck bottles. These preforms, for example, can have a neck section with an outside diameter measured over the outside threaded sections of greater than 48 mm, for example, from 48 mm to 300 mm. Due to the relatively high pressures which can occur in the injection molding process, in the injection molding tool often there can be only few cavities because otherwise the required closing forces become too large. This can make production of these preforms more expensive. In the quasi-extrusion blow molding method these preforms however can be produced comparatively economically.

The quasi-extrusion blow molded preforms according to the exemplary embodiment of the disclosure can be used for production of plastic containers, for example, plastic bottles, in a single stage or two-stage stretch blow molding process. A single-stage stretch blow molding process can be defined as a method in which the preforms are moved into the final mold immediately after their production. In the two-stage stretch blow molding process the preforms can be produced separately in space and time from the stretch blow molding process, and the preforms which have been produced are stored in the interim until their use.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A preform for producing plastic containers in a stretch blow molding process, comprising:
   a neck section having an inside wall;
   a body section adjoining the neck section;
   a preform bottom for closing the body section;
   a supporting ring which protrudes from an outside wall of the preform and separates the neck section from the body section, wherein the preform is produced in an extrusion blow molding process and the body section has an outside diameter which is made tapered from the supporting ring in a direction of the preform bottom; and
   a recessed groove formed in the inside wall of the neck section opposite the supporting ring.

2. The preform as claimed in claim 1, wherein the body section of the preform has an axial length which is substantially 0.3 times to substantially 8 times an outside diameter of the neck section.

3. The preform as claimed in claim 1, wherein the body section has an average wall thickness of 0.4 to 4 mm.

4. The preform as claimed in claim 1, comprising:
   a transparent visual strip which runs axially in the body section.

5. The preform as claimed claim 1, wherein the supporting ring is hollow.

6. The preform as claimed in claim 1, wherein the outside diameter of the body section tapers continually in a direction of the preform bottom.

7. The preform as claimed in claim 6, wherein the outside wall of the body section includes an angle (a) of 0.5° to 5° with an axis of the preform.

8. The preform as claimed in claim 1, wherein the preform is extruded to include one or more layers.

9. The preform as claimed in claim 8, extruded to include several layers and comprising:
   at least one layer with barrier additives, including at least one of oxygen traps, nanoclays or UV blockers.

10. The preform as claimed in claim 8, extruded to include several layers and comprising:
    at least one of a barrier layer against oxygen, a barrier layer against UV radiation, a slip coating and a residual emptying coating.

11. The preform as claimed in claim 8, extruded to include in several layers and comprising:
   at least one layer of recycled plastic material.

12. The preform as claimed in claim 1, formed from at least one layer of a plastic or of a plastic mixture of the group consisting of polyolefins, polystyrenes, PVC, PVDC, polyesters, PLA and amides.

13. The preform as claimed in claim 12, comprising:
   at least one layer of PET with an intrinsic viscosity greater than 0.92 dl/g, but less than 1.6 dl/g.

14. The preform as claimed in claim 12, comprising:
   at least one layer of monomodal, bimodal or polymodal HDPE or polypropylene.

15. The preform as claimed in claim 14, comprising:
   at least one layer of HDPE with a MFI 190° C. 2.16 kg smaller 0.1 g/10 min or MFI 190° C. 21.6 kg smaller 5 g/10 min.

16. The preform as claimed in claim 1, comprising:
   an outside wall of the neck section having threaded sections.

17. The preform as claimed in claim 16, wherein the neck section comprises:
   an outside diameter which is, measured over the threaded sections from 48 mm to 300 mm.

18. The preform as claimed in claim 16, wherein the threaded sections are hollow.

19. A method for producing a preform including a blow-formed neck section, a blow-formed body section adjoining the neck section, a blow-formed preform bottom for closing the body section, a blow-formed supporting ring which protrudes from an outside wall of the preform and separates the neck section from the body section and a blow-formed recessed groove on an inside wall of the neck section opposite the supporting ring, wherein the body section has an outside diameter which tapers from the supporting ring in a direction of the preform bottom, the method comprising:
   extruding a single-layer or multilayer plastic tubing;
   forming a preform having the neck section, body section, bottom, supporting ring, and recessed groove from the plastic tubing with a blow mold, with the neck section and the body section being closed with the preform bottom, and being separated from one another by the supporting ring;
   removing the preform from the blow mold; and
   pressing the plastic tubing surrounded by the blow mold for forming the body section with an outside diameter which is tapered from the supporting ring in a direction of the preform bottom with a support pressure against inside walls of the blow mold.

20. The method as claimed in claim 19, wherein the support pressure is 0.1 bar to 8 bar.

* * * * *